US007898122B2

(12) United States Patent
Andrieux et al.

(10) Patent No.: US 7,898,122 B2
(45) Date of Patent: Mar. 1, 2011

(54) QUICK-ACTION BISTABLE POLARIZED ELECTROMAGNETIC ACTUATOR

(75) Inventors: Gael Andrieux, Besancon (FR); Stephane Biwersi, Besancon (FR)

(73) Assignee: Moving Magnet Technologies (MMT), Besancon (FR)

( * ) Notice: Subject to any disclaimer, the term of this patent is extended or adjusted under 35 U.S.C. 154(b) by 350 days.

(21) Appl. No.: 11/910,172

(22) PCT Filed: Apr. 6, 2006

(86) PCT No.: PCT/FR2006/000768

§ 371 (c)(1), (2), (4) Date: Apr. 10, 2008

(87) PCT Pub. No.: WO2006/106240

PCT Pub. Date: Oct. 12, 2006

(65) Prior Publication Data

US 2008/0284261 A1 Nov. 20, 2008

(30) Foreign Application Priority Data

Apr. 6, 2005 (FR) .................................. 05 03436

(51) Int. Cl.
*H02K 33/00* (2006.01)
*H02K 33/14* (2006.01)
*F01L 9/04* (2006.01)

(52) U.S. Cl. ............................ 310/30; 310/28; 310/29; 310/32; 310/34; 310/35; 310/36; 310/37; 123/90.11

(58) Field of Classification Search ............ 310/34–37, 310/28–30, 32; 335/229; 123/90.11
See application file for complete search history.

(56) References Cited

U.S. PATENT DOCUMENTS 4,533,890 A * 8/1985 Patel .......................... 335/234
4,855,700 A * 8/1989 Mohler ....................... 335/229
5,682,097 A * 10/1997 Bryant et al. .......... 324/207.17
6,176,207 B1 * 1/2001 Wright et al. ............ 123/90.11

(Continued)

FOREIGN PATENT DOCUMENTS

DE 10146899 A1 * 4/2003

(Continued)

OTHER PUBLICATIONS

Machine Translation JP2005204444 (2005).*

(Continued)

*Primary Examiner*—Quyen Leung
*Assistant Examiner*—Jose A Gonzalez Quinones
(74) *Attorney, Agent, or Firm*—Oblon, Spivak, McClelland, Maier & Neustadt, L.L.P.

(57) ABSTRACT

The invention relates to an electromagnetic actuator comprised of a mobile assembly, a fixed ferromagnetic stator assembly, at least one electric field coil, and of at least one permanent magnet, having two stable positions of equilibrium without current at its ends of travel. The invention is characterized in that the mobile assembly has two distinct ferromagnetic armatures placed on both sides of the stator assembly and each forms, together with the stator assembly, at least one magnetic circuit, and is characterized in that the permanent magnet magnetically cooperates with one of the other ferromagnetic mobile parts in a stable position of equilibrium without current at the end of travel.

27 Claims, 3 Drawing Sheets

U.S. PATENT DOCUMENTS

Figure 1:
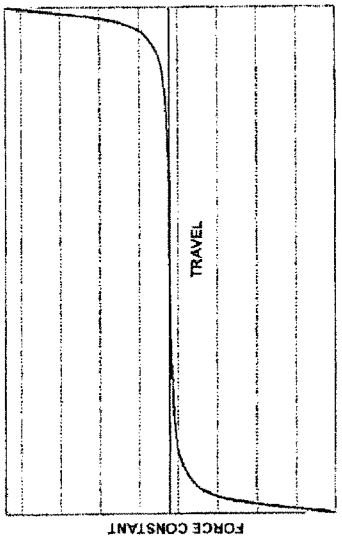

| | | | | |
|---|---|---|---|---|
| 6,334,413 | B1 * | 1/2002 | Hattori et al. | 123/90.11 |
| 2002/0069842 | A1 * | 6/2002 | Curtis et al. | 123/90.11 |
| 2003/0106511 | A1 * | 6/2003 | Haskara et al. | 123/90.11 |
| 2006/0169230 | A1 * | 8/2006 | Ervin et al. | 123/90.11 |

FOREIGN PATENT DOCUMENTS

| | | | | |
|---|---|---|---|---|
| EP | 1 010 866 | A2 | | 6/2000 |
| FR | 2 791 487 | A1 | | 9/2000 |
| JP | 2005204444 | A | * | 7/2005 |

OTHER PUBLICATIONS

Machine Translation DE10146899 (2003).*

* cited by examiner

QUICK-ACTION BISTABLE POLARIZED ELECTROMAGNETIC ACTUATOR

The present invention relates to the field of polarized electromagnetic actuators, more particularly intended to applications requiring short displacement times on a significant travel, and, for example, the electric actuation of the valves in an internal combustion motor.

In the state of the art, solutions of non-polarized valve actuators intended for actuation are known, such as described, for example, in U.S. Pat. No. 6,078,235. An actuator according to this example includes two fixed electromagnets placed on either side of a mobile ferromagnetic armature capable of coming into contact with either one of the electromagnets according to the supply of two coils, each mounted on one of the electromagnet stators. Return springs are also distributed on either side of the electromagnetic system, which secures a de-energized equilibrium position in the middle of the total travel of the mobile armature. However, these solutions have several inconveniences. For example, they need a holding current when the actuator is in an extreme position (for example, in the case of a closed valve). Besides, they require an initialization phase, when the system is started, intended to have the mobile mass pass from one median position to the upper position and they offer limited controllability.

Besides, in the-state-of-the-art, polarized electric actuators for valves are known, which can remedy these inconveniences and offer advantages, which are specific to polarized bistable actuators: holding in end of travel position, with no power consumption, better system controllability.

Such actuators are, for example, disclosed in European patent EP 1 010 866. An actuator according to this example includes two fixed electromagnets, at least one of which is polarized by a pair of properly placed magnets, positioned on either side of a mobile ferromagnetic unit, which can come into contact with the first electromagnet or with the second electromagnet, depending on the selected driving sequences. As described, this example makes it possible to electrically modulate the de-energized attraction efforts generated by the magnets through the electromagnets on the mobile unit and to reduce the power consumption thanks to de-energized stable positions. However, in this configuration each magnet interacts with one electromagnet only, which induces a non-optimal use of the magnetic flux generated by the magnets. The same is true for the coils which provide no optimal co-operative use with both polarized electromagnets.

The object of the present invention is to optimize the performance of magnets fitted in the polarized electromagnetic structure and to provide an optimized and simplified driving mode.

Therefore, the actuator according to the invention has a single fixed statoric part, which is properly polarized by at least one magnet and associated with at least one coil, and a mobile ferromagnetic part composed of two ferromagnetic armatures which are made integral with the same mobile element and exposed on either side of the stator.

When so defined, the electromagnetic actuator includes a first de-energized stable position when the so-called upper armature of the mobile part is in contact with the upper part of the stator, thus defining a first remarkable magnetic circuit associated with a first preferential flux path. Similarly, the electromagnetic actuator includes a second de-energized stable position when the so-called lower armature of the mobile part is in contact with the lower part of the stator, thus defining a second remarkable magnetic circuit associated with the second preferential flux path.

When the mobile part is in the median position opposite the stator part, the de-energized magnetic flux is divided equally between the two remarkable magnetic circuits. The mobile mass is thus in an unstable equilibrium position.

The magnet totally cooperates (without taking leakages into account) with the mobile part at the end of the travel. The same magnet alternately cooperates with either one of the ferromagnetic parts at the end of the travel. The magnet “totally” cooperates with the mobile part at the end of the travel and then it “totally” cooperates with the other mobile part.

Besides, this type of armature has the special feature of producing a very important de-energized force in each of the de-energized end of travel stable positions.

Figure 2:
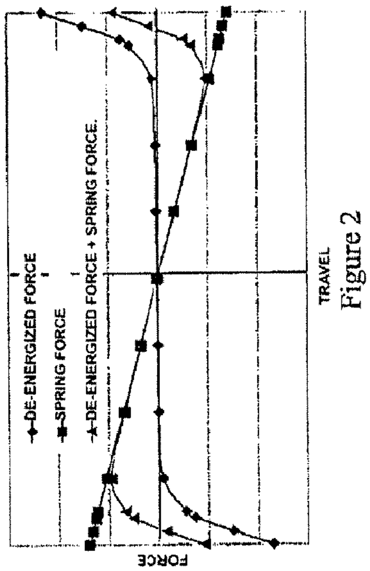

Besides, this type of actuator has the remarkable feature of having a relatively lower force on an important part of its travel, as shown in FIGS. 1 & 2. Then, the counter electromotive force exerted on the moving mobile part is significantly reduced on the greatest part of the travel.

Advantageously, the fixed part is composed of a ferromagnetic core surrounded by a thin transversely magnetized magnet, said core being further surrounded by at least an electric coil coaxial with the permanent magnet, said fixed part further including an external yoke surrounding said permanent magnet and said fixed coil in order to form polar tips capable of cooperating with either one of the ferromagnetic armatures of the mobile part.

According to one aspect of the invention, the statoric assembly has a rectangular cross-section.

According to another aspect of the invention, the statoric assembly has a circular cross-section.

Advantageously, the mobile assembly is composed of an axis going through the statoric assembly and supporting at least one ferromagnetic armature having a cross-section corresponding with the cross-section of the statoric part yoke.

In one configuration, the electromagnetic actuator has two sets of independently connected energizing coils.

In a preferred, although not exclusive, configuration, each of the remarkable magnetic circuits is associated with an energizing coil which is properly connected (in series or in parallel) with its matching neighbor, thus defining a single electric phase. In this special configuration, the arrangement of the coils in the electric phase is carried out so that the magnetic flux generated by the first coil is substracted from the de-energized flux of the first remarkable magnetic circuit, whereas the magnetic flux generated by the second coil is added to the de-energized flux of the second remarkable magnetic circuit. According to the thus defined supply mode, the actuator can be driven using a single bipolar current.

Thus, the actuator according to this preferred alternative is single-phase and run through by a bipolar current. This further makes it possible to reduce the number of power transistors and the cost of electronics (at most 4 transistors).

According to a preferred driving mode, the current supplying the electric phase of the actuator can be modulated, without having to change its polarity, so as to slow down or to accelerate the mobile unit during its travel for one end of travel to the other. A better driving capacity is attained with the actuator while keeping good current dynamics. This driving mode makes it possible to implement a “soft landing” strategy and thus to dramatically reduce the noise caused by the landing of the mobile part on the statoric part.

This type of actuator also has a special feature in that it groups in its center the statoric part, i.e. a ferromagnetic part including one or several permanent magnets, and one or several coils too. This specificity makes it possible to concentrate the energizing magnetic flux in a localized and controlled area. This is a specificity which can be taken advantage of during the integration of at least one of the remarkable magnetic circuits of a position sensor if any, for example a Hall-effect or an inductive type position sensor.

According to a preferred alternative, the actuator includes an elastic return system exerting a force on each of the ends of the mobile unit intended to hold the latter close to the middle of its travel and thus giving the thus designated actuator the quality of mass-spring system. The above mentioned actuator having the properly dimensioned elastic elements has two de-energized useful equilibrium positions and improved displacement dynamics.

According to a particular embodiment, the actuator includes two compression springs, each exerting a balanced force on each of the mobile armatures. Thus, the mobile armatures can advantageously be used not as the single magnetic unit, but also as a mechanical stop for the springs.

According to a particular embodiment, the springs are placed on the same side of the mobile unit and they each are separated by a third part connected to the mobile unit.

The elastic return system described herein gives the mobile assembly, by nature, a maximum velocity in the middle of the travel, which is high on the greatest part of the travel and almost null in the vicinity of the travel ends, and thus it should be noted that it is perfectly suitable for the actuator principle described herein. As a matter of fact, as the counter electromotive force is by nature proportional to the velocity of the mobile part and likely to slow it down, the latter being reduced on the greatest part of the travel, or even almost null as soon as the travel becomes relatively significant, then it makes it possible to reduce the losses which could penalize the system dynamics as much as possible.

According to a particular embodiment, the structure has an extrusive geometrical invariance and thus makes it possible to advantageously make the magnetic circuit of the actuator in a laminated magnetically soft material.

According to a first alternative, the armature can be polarized by two flat magnets positioned symmetrically with respect to the principal axis of the actuator. According to a second alternative, the actuator can be axisymmetrically defined using a single magnetized thin bushing which is substantially radially magnetized.

The electromagnetic actuator includes a magnetized thin bushing having an axis of revolution which is colinear with the main axis of the actuator and which is substantially radially magnetized.

When they so fitted and when the mobile part is removed, the magnets distribute a magnetic field in the stator which makes a loop in the air surrounding the stator poles. The magnetic fluxes generated by the magnets thus describe a magnetic circuit which can be advantageously used during the magnetization phase. Therefore, this can be advantageously done when the magnets are already integrated in the magnetic armature. Thus, substantial time is saved on the magnetization phase since a single polarized stator is required and some time is also saved on the assembling phases which are therefore simplified thanks to the handling of non-magnetized magnets.

This type of actuator has a useful travel which is substantially equal to the sum of the air-gap separating the so-called lower armature of the bottom part of the statoric assembly and the air-gap separating the so-called upper armature in the top part of the statoric assembly. According to the manufacturing and assembling constraints, the constraints relating to dimensions and the constraints relating to the integration in the complete system, the mechanical stops defining the end of travel should be appropriate.

Thus, according to a first particular alternative, the start of travel and end of travel mechanical stops are made by the direct contact of the ferromagnetic armatures on the ferromagnetic statoric part.

According to a second particular alternative, the mechanical stops will be made by the addition of a third amagnetic part located between the ferromagnetic armatures and the ferromagnetic statoric part. Thus, the contact air-gap can be adjusted so as to adjust the effort for holding the de-energized stable positions. According to well known techniques, these third parts can be made, for example by mechanically adding a part or by depositing some material.

The statoric and/or mobile parts have a nonmagnetic part which secures a residual air-gap in the ends of travel.

According to a third particular alternative, the mechanical stops can be shifted and no longer be made directly between the armatures and the statoric assembly. Thus, the mechanical stops are made between one or several units connected to the mobile part and one or several units connected to the statoric part. In addition to shifting the start and end of travel stops, this artifice also makes it possible to adjust the useful travel and the de-energized force holding the stable positions at the ends of the travel.

At the ends of the travel positions remains a residual air-gap between the armature and the statoric part, the contact being made between an element of the mobile part and an element of the frame which the statoric part is integral with.

Figure 11:
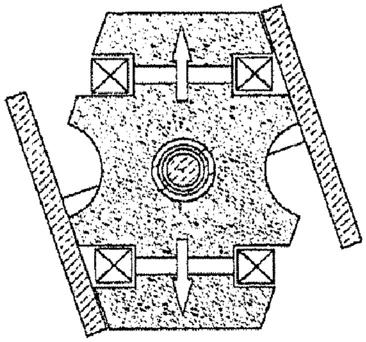

According to a particular alternative, the mobile part is hinged around a rotation axis which is substantially located at the center of the median plane of the structure. Thus, both armatures are integral with a rotating axis and come into contact with the statoric part through the bevelling of the magnetic poles of the statoric part or the rotor part (FIG. 11). The bevels angle makes it possible to adjust the dimension of the angular travel of the actuator to the designers' request. In addition to this arrangement, the magnetic structure remains substantially the same as for a linear actuation. Similarly to the linear alternatives, this alternative can also be associated with the elastic return system, using for example, and not exclusively, compression springs or helicoidal springs.

According to one aspect of the invention, the electromagnetic actuator includes at least one position sensor integrated in the statoric structure.

According to another aspect of present invention, the electromagnetic actuator includes at least one position sensor integrated in the mobile structure.

According to yet another aspect of the present invention, the information relating to current and/or position makes it possible to obtain an optimized driving and more particularly a minimization of the impact velocity at the end of the travel.

Figure 3:
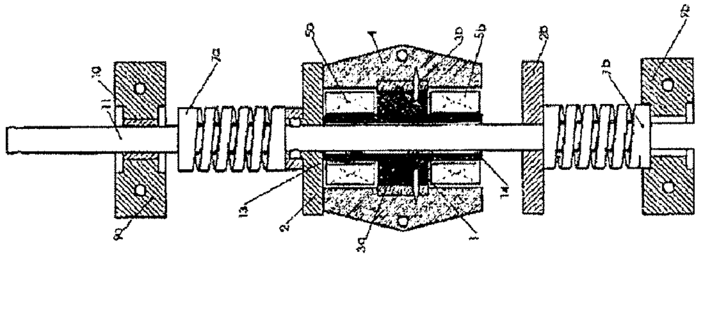
Figure 4:
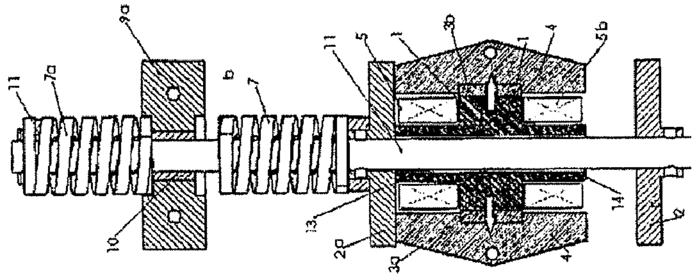
Figure 5:
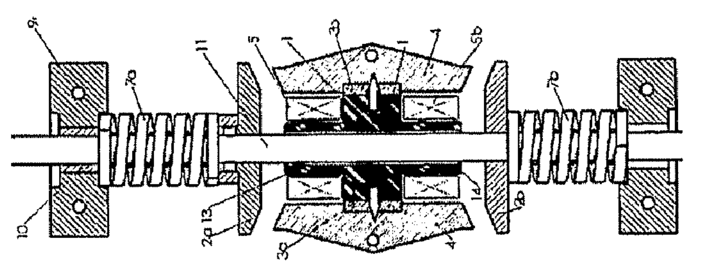
Figure 8:
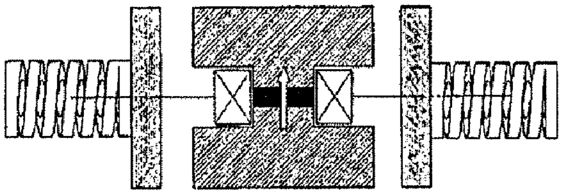
Figure 7:
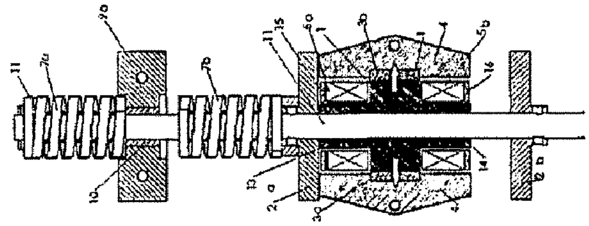
Figure 10:
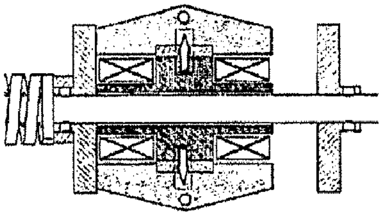
Figure 6:
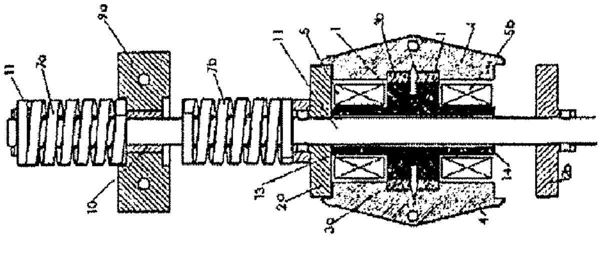
Figure 9:
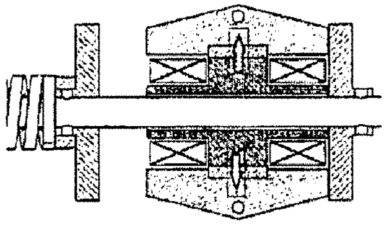
Figure 14:
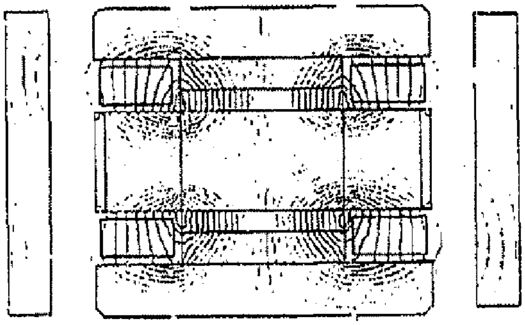
Figure 13:
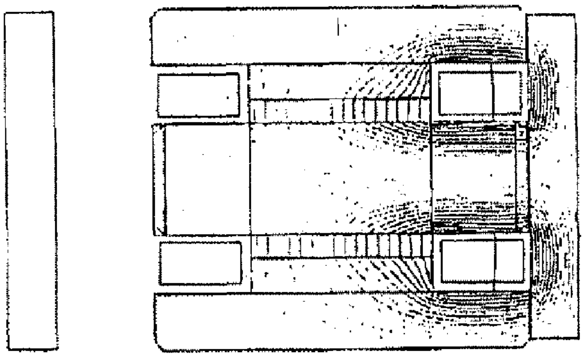
Figure 12:
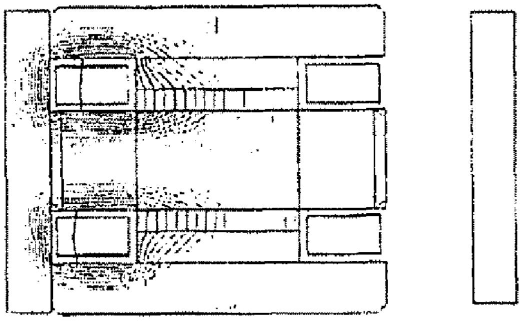

The invention will be better understood when reading the following description or referring to the appended drawings where:

FIG. 1 shows the pace of the variation of an actuator force constant according to the invention, depending on the position of the mobile part, FIG. 2 shows the pace of the variation of the de-energized force profiles, of the elastic return system and of the coupling of these two forces, depending on the position of the mobile unit, FIG. 3 shows a cross-sectional view of an actuator according to the invention, FIG. 4 shows a cross-sectional view of an alternative of an actuator according to the invention, FIG. 5 shows a cross-sectional view of an actuator according to a particular alternative of the invention, FIG. 6 shows a cross-sectional view of an actuator according to a particular alternative of the invention, FIG. 7 shows a cross-sectional view of an alternative actuator according to the invention in which is implemented an inductive sensor solution in the form of added coils 15, 16 detecting the variations of the magnetic flux which flows in the remarkable magnetic circuits. Therefore, it is easy to derive the position of the mobile unit, FIG. 8 shows a cross-sectional view of an alternative actuator according to the invention, defined in that it has a single coil and a single magnet, FIG. 9 shows a cross-sectional view of the actuator where the mobile part is in the upper position, FIG. 10 shows a cross-sectional view of the actuator where the mobile part is in the lower position, FIG. 11 shows a cross-sectional view of a rotating alternative of an actuator according to the invention, FIG. 12 shows the distribution of the magnetic flux lines through the structure when the mobile unit is in the lower position. This position is considered as peculiar, FIG. 13 shows the distribution of the magnetic flux lines through the structure when the mobile unit is in the upper position. This position is considered as peculiar, FIG. 14 shows the distribution of magnetic flux lines through the structure when the mobile unit is centered on its travel.

The actuator shown as a non-limitative example in FIG. 3 includes a statoric part composed of parts made of ferromagnetic soft material 1, 3. The part 1 forms a core. The part 3 forms a yoke. This assembly defines a statoric magnetic circuit polarized by two flat magnets 3*a*, 3*b*. The later are substantially symmetrically magnetized with respect to the perpendicular plan to the section plan in FIG. 3 and going through the main axis of the actuator. The yoke 3 extends on both sides of the core 1.

The parts composing the statoric part can be, for example, made of laminated magnetic mild steel of the iron silicon type or of nonmagnetic sintered mild steel of the phosphorus iron type in order to limit eddy-current losses.

A mobile ferromagnetic part is composed of 2 armatures 2*a*, 2*b* distributed on either side of the statoric part and integral with a nonmagnetic axis 11, made of nonmagnetic stainless steel, for example. FIG. 14 shows the actuator in the medium of its travel. In this position, the distribution of de-energized electric lines of flux through the ferromagnetic structure is symmetrical with respect to the plan perpendicular to the cross-section plan and parallel to the axis. This unstable magnetic equilibrium position is reinforced by the addition of two springs 7*a*, 7*b* which are placed and preloaded, so that the middle of the travel position is mechanically stable without current. This is made possible because a fixed part 9*a*, 9*b* is present, which is a symbolic representation of a nonmagnetic frame on which the present invention would be fitted. In the case where the aimed application is an electrified valve actuator for an internal combustion motor, the frame can be, for example, the engine casing and the axis 11 would thus be made integral with the valve to be displaced.

The moving mobile part is integral with the axis 11 and is linearly guided by guiding artifacts that are designated 10 as adjusted bearings in the example.

FIGS. 9 and 10 show both end of travel positions of the actuator. More particularly FIG. 10 shows the extreme lower position of the mobile part and in this case the upper armature 2*a* is in contact or close to being in contact with the statoric part. This stable position is held thanks to the de-energized force which is very high in this contact or quasi-contact position. FIG. 8 is then similar to FIG. 9 but this time for an upper position axis and a lower armature 2*b* in contact with the statoric parts.

When the mobile part is in the lower position as shown in FIG. 10, the de-energized magnetic flux follows a preferred path as shown in FIG. 12. This is a first remarkable magnetic circuit. Similarly, when the mobile part is in the upper position as shown in FIG. 9, the de-energized magnetic flux will preferably follow a second preferred magnetic circuit as shown in FIG. 13. Both these circuits define both de-energized end of travel stable positions. When the mobile part is located between the two ends of travel, the distribution of the de-energized magnetic field is globally proportional to the travel of the mobile part with respect to the total travel. Thus, and as shown in FIG. 14, the middle of travel is shown by a symmetrical distribution of the de-energized flux between both armatures 2*a* and 2*b* of the mobile unit and therefore of a null de-energized force, in this position.

Two coils 5*a*, 5*b* are located in two recesses provided therefor. A first coil 5*a* is wrapped on a polar part 13 of the stator, so that the coiling axis is colinear with the motion axis. Similarly, a second coil 5*b* is fitted on second statoric polar part 14. Both coils are preferably connected to one another (in series or in parallel) to form a single phase so that, when a current flows in an arbitrarily positive direction in the phase, the magnetic flux generated by the electric current is added to the de-energized flux generated by the magnets in the polar part 13 and is substracted from the de-energized flux generated by the magnets in the polar part 14. Similarly, an arbitrarily negative current in the phase will add the de-energized and the energized fluxes in the polar part 14, but will subtract them in the polar part 13. Then, when the mobile part comes to the end of travel in the lower position illustrated by FIG. 10, a negative current generates a magnetic flux which is subtracted from the de-energized flux. Thus, the de-energized holding force is cut by a quantity which is directly related to the intensity of the current flowing in the electric phase. It will then correspond to a value of the electric current making it possible for the return force generated by the spring system to overtake the de-energized holding force. The mobile unit will thus leave this de-energized stable equilibrium position 13 and rapidly accelerate and go towards the other end of the travel 14 and its second stable equilibrium position. When the mobile unit is beyond the middle of the travel (the place where its kinetic energy is maximum), the current flowing in the phase then becomes a driving current since it generates a magnetic flux which is added to the de-energized flux on the polar appendix 14. The total velocity of the mobile unit is then related to the spring stiffness and to the current running through the electric phase, too. Thus, we can have a moderation of the impact velocity of the mobile part on the statoric part (or the end of travel mechanical stops) by adjusting as best as possible the current in the electric phase. As soon as the mobile unit travel is completed and when it is in contact with the statoric part, the current can become null without the mobile part leaving its second de-energized stable equilibrium position 14. The travel is made in the other direction when the polarity of the current is changed.

Using one or several position sensors integrated in the structure (such as described in FIG. 7, for example), or added to the structure, makes it possible to optimize the driving of the actuator, and more particularly to manage the impact velocity of the mobile part on the statoric part through a closed loop servo-controlled operation.

As regards the aimed application in a given stable position, it is possible to consider supplying the electric phase so that the energized force is added to the de-energized force. Thus, a holding force higher than the de-energized force is created with very little current. This method can be implemented up to the overheating limits of the system, so as to obtain a maximum contact force. Thus, much higher loads can be supported in the end of travel stable positions.

The invention has been described hereabove by non-limitative examples. Of course, a man with ordinary skills in the art will be able to make a few modifications without leaving the scope of the present invention.

The invention claimed is:

1. An electromagnetic actuator, comprising:

a fixed ferromagnetic statoric assembly including a single electric energizing coil and a permanent magnet;

first and second separate ferromagnetic armatures distributed on either side of the statoric assembly, the first and second armatures having a fixed relative position and being movable between first and second de-energized stable end positions;

the first and second armatures each forming one magnetic circuit with the statoric assembly in the first and second end positions, respectively; and the permanent magnet magnetically cooperates with the first and second armatures to form a magnetic circuit, respectively, in each of the first and second end positions.

2. An electromagnetic actuator according to claim 1, characterized in that the statoric assembly is composed of a ferromagnetic core surrounded by a thin transversely magnetized magnet, said core being further surrounded by the electric coil coaxial with the permanent magnet, said statoric assembly further including an outer yoke surrounding said permanent magnet and said electric coil, so as to form pole tips capable of magnetically cooperating with either one of the ferromagnetic armatures.

3. An electromagnetic actuator according to claim 1, characterized in that the statoric assembly has a rectangular cross-section.

4. An electromagnetic actuator according to claim 1, characterized in that the statoric assembly has a circular cross-section.

5. An electromagnetic actuator according to claim 2, further comprising an axis going through the statoric assembly and supporting at least one ferromagnetic armature having a cross-section corresponding to the cross-section of the outer yoke.

6. An electromagnetic actuator according to claim 2, further comprising an axis going through the statoric assembly and supporting the first and second ferromagnetic armatures disposed on either side of the statoric assembly.

7. An electromagnetic actuator according to claim 1, characterized in that the first and second armatures move linearly.

8. An electromagnetic actuator according to claim 1, characterized in that the electromagnetic actuator is single-phase.

9. An electromagnetic actuator according to claim 1, further comprising an elastic system exerting a force tending to hold the first and second armatures close to a middle of travel of the first and second armatures.

10. An electromagnetic actuator according to claim 9, characterized in that said elastic system is composed of two compression springs, each exerting a substantially equivalent force on each of the first and second armatures composing mechanical stops for the springs.

11. An electromagnetic actuator according to claim 10, characterized in that springs are placed on a same side of the statoric assembly and separated by an additional mechanical part mounted on an axis of the first and second armatures.

12. An electromagnetic actuator according to claim 1, further comprising two flat magnets disposed substantially symmetrically with respect to a median plane containing a displacement axis of the first and second armatures.

13. An electromagnetic actuator according to claim 1, further comprising a magnetized thin bushing (OZ), having an axis of revolution which is colinear with a main axis of the actuator and which is substantially radially magnetized.

14. An electromagnetic actuator according to claim 1, characterized in that the statoric part is laminated.

15. An electromagnetic actuator according to claim 1, characterized in that either armature comes in direct contact with the statoric assembly in the ends of travel positions.

16. An electromagnetic actuator according to claim 1, further comprising a nonmagnetic part which secures a residual air-gap in the ends of travel of the first and second armatures.

17. An electromagnetic actuator according to claim 1, characterized in that a residual air-gap is maintained at ends of travel positions of the armatures between the armatures and the statoric assembly, by an element of the armatures and an element of a frame which the statoric assembly is integral with.

18. An electromagnetic actuator according to claim 1, characterized in that a current modulation in a phase of the actuator allows a minimization of an impact velocity at an end of travel.

19. An electromagnetic actuator according to claim 1, further comprising at least one sensor detecting a position of the first and second armatures.

20. An electromagnetic actuator according to claim 1, further comprising at least one position sensor embedded in a statoric armature.

21. An electromagnetic actuator according to claim 1, further comprising at least one position sensor integrated in the first or second armature.

22. An electromagnetic actuator according to claim 1, further comprising at least one means for determining a current in at least one of the actuator's phases.

23. An electromagnetic actuator according to claim 1, further comprising means for optimizing driving of the actuator by minimizing an impact velocity at an end of travel of the first and second armatures based on current information of a phase of the actuator and/or position information of the first or second armature.

24. An electromagnetic actuator according to claim 1, wherein the first and second armatures are hinged around a rotating axis and are arranged to contact the statoric part by rotating to one of the first and second end positions to contact a beveled surface of magnetic poles of the statoric part.

25. An electromagnetic actuator according to claim 24, wherein the rotation axis is located substantially at a center of a median plane between the first and second armatures.

26. An electromagnetic actuator according to claim 24, wherein a direction of the rotating of the first and second armatures lies in a plane which cross-sects the single coil.

27. An electromagnetic actuator according to claim 1, wherein the single coil has a long axis which extends in a linear direction which is common to a direction of travel of the first and second armatures between the first and second de-energized stable end positions.

* * * * *